3,337,511
PROCESS OF COPOLYMERIZING ALKYLENE
OXIDE AND CYCLIC ACID ANHYDRIDE
Kazuo Matsuura and Teiji Tsuruta, Kyoto-shi, Japan, assignors to Nippon Oil Co., Ltd., Tokyo, Japan, a corporation of Japan
No Drawing. Filed Aug. 21, 1964, Ser. No. 391,301
Claims priority, application Japan, Aug. 24, 1963,
38/44,908
14 Claims. (Cl. 260—78.4)

The present invention relates to a process for the polymerization of alkylene oxide and more particularly to a process for the production of a novel copolymer of alkylene oxide. The novel copolymer of the present invention is produced by polymerizing an alkylene oxide using a catalyst system containing as a component thereof an organometallic compound of a metal of the group I–III of the Periodic Table in the presence of a cyclic acid anhydride.

In high polymer industry, it has been an important problem to produce a high polymer of alkylene oxide in high yield. Many studies have already been made on the high polymerization reaction of alkylene oxide using an organometallic compound as the catalyst.

However, there has been reported nothing as to co-polymerization of alkylene oxide and cyclic acid anhydride using an organometallic compound as the catalyst. Thus, the present invention is characterized by that in the polymerization of an alkylene oxide using an organo-metallic compound as the catalyst, the polymerization is carried out in the presence of a cyclic acid anhydride. The cyclic acid anhydride used in the process of the present invention acts as a comonomer for the alkylene oxide so that polymers obtained by the process of the present invention have novel physical properties completely different from those of alkylene oxide homopolymers.

Cyclic acid anhydrides used in the polymerization process of the present invention are known that in general they do not undergo polymerization in themselves alone. As will be more fully explained hereinafter with examples, we have discovered that when an alkylene oxide is polymerized in the presence of such cyclic acid anhydride which does not undergo polymerization in itself alone, substantial amount of the cyclic acid anhydride enters into the polymerization product as comonomer and a polyester or a polyether is produced. Thus, according to the process of the present invention a novel polyester or a polyether can be obtained in high yield from cyclic acid anhydride which does not undergo polymerization in itself alone by copolymerizing it with an alkylene oxide. Such process of the present invention is thought to have an important practical value.

Alkylene oxide which may be used in the process of the present invention may be represented by the following general formula:

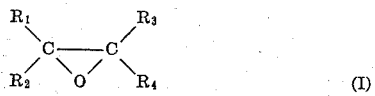

(I)

In the above formula $R_1$, $R_2$, $R_3$, and $R_4$ are radicals selected from the group consisting of hydrogen, alkyl, vinyl, aryl, chloromethyl, bromomethyl, fluoromethyl, trifluoromethyl, halogen, allyloxymethyl and phenoxymethyl radicals but not all of substituents in the Formula I may be a radical or radicals selected from vinyl and trifluoromethyl. Examples of such alkylene oxides are ethylene oxide, propylene oxide, epichlorohydrin, styrene oxide, allyl glycidyl ether and phenyl glycidyl ether. Alkylene oxides which may be used in the process of the present invention also include cyclohexene oxide and derivatives thereof that may be regarded as compounds forming a link between $R_2$ and $R_3$ in the Formula I.

Cyclic acid anhydrides which may be used in the process of the present invention may be represented by the following general formulas:

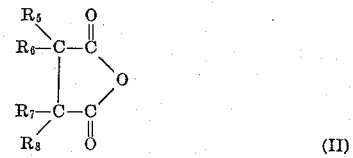

(II)

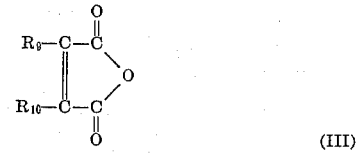

(III)

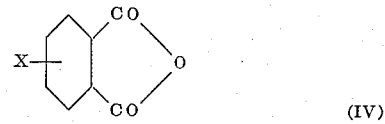

(IV)

In above formulas, $R_5$, $R_6$, $R_7$, $R_8$, $R_9$ and $R_{10}$ are radicals selected from the group consisting of hydrogen, alkyl and aryl radicals, X is a radical selected from the group consisting of hydrogen, alkyl, aryl, aralkyl, halogen and endo-methylene radicals and the six-membered ring of the Formula IV may either be a saturated carbon ring or a carbon ring containing an unsaturated carbon-carbon double bonds. Examples of cyclic acid anhydrides of above formulas are succinic anhydride, phthalic anhydride, tetrahydrophthalic anhydride, endo - methylenetetrahydrophthalic anhydride, hexahydrophthalic anhydride and like.

Structure and physical properties of polymer obtained by the process of the present invention vary depending on the molar ratio of alkylene oxide to cyclic acid anhydride.

Organometallic compounds used as catalyst in the process of the present invention may be represented by the general formula $R_nM$ wherein M is a metal atom of the Group I–III of the Periodic Table, $n$ is an integer from 1 to 3 inclusive, and R is a radical selected from the group consisting of alkyl, cycloalkyl, aryl and aralkyl radicals, and some but not all of these radicals may be a radical or radicals selected from the group consisting of hydrogen, halogen, hydroxy and alkoxy radicals. There may be raised as examples of such organometallic compounds, organozinc compounds such as dimethyl zinc, diethyl zinc, di-n-propyl zinc, di-isopropyl zinc, organoaluminum compounds such as trimethyl aluminum, triethyl aluminum, tri-n-butyl aluminum, tri-isobutyl aluminum and like.

Also, a catalyst system consisting of an organometallic compound described above and 0.5 to 5 mols per mol based on the metal of the organometal compound of a compound containing at least one active hydrogen atom such as water, alcohol, amine, thiol is effective as catalyst for the process of the present invention.

There is no particular limitation as regards the amount of catalyst used. Commonly, the catalyst is used in a proportion of about 0.01 to 10 mol percent as the concentration of metal in organometallic compounds, based on the total monomers.

The polymerization of the present invention may be carried out in the absence or in the presence of a suitable solvent. As solvent, when used, those commonly used in the polymerization of alkylene oxide may be used. Inert solvents such as ether e.g. tetrahydrofuran dioxane and aromatic hydrocarbon e.g. benzene, toluene may be given as examples of such solvents.

There is no particular limitation as regards the polymerization temperature. Ordinarily, the polymerization is carried out at a temperature from −78° C. to 200° C.

For better understanding of the present invention, examples will be set forth below. It will be understood, however, that these examples are for the purpose of illustration and it is not intended to limit the present invention to those described in the examples.

Example 1

1.485 grams of phthalic anhydride were placed in a polymerization tube having an internal capacity of 50 ml. and dissolved by adding 10 ml. of dioxane. To the solution 0.78 ml. of epichlorohydrin (molar ratio of phthalic anhydride:epichlorohydrin=1:1) was then added, and after replacing air in the tube by nitrogen 0.02 ml. of triethyl aluminum (1 mol percent based on total monomers) was added. The polymerization tube was then sealed and placed in a bath maintained at 80° C. and kept therein for ten days for polymerization. Then the polymerization tube was opened and 500 ml. of methanol were added under agitation to separate the polymer formed from the tube. Crude polymer separated was dissolved in chloroform and filtered to remove insoluble residue. Chloroform was then distilled off.

To remove a remaining trace of unchanged monomer the crude polymer thus obtained was purified by extracting with hot methanol for 20 hours. Purified polymer was obtained in a yield of 84%. It had a reduced viscosity of $\eta_{sp./c.}=0.067$ (in chloroform at 30° C., c.=1 g./dl.) and a melting point of 180°–205° C.

Infrared spectrum of the polymer thus obtained showed strong absorption bands which are considered due to carbonyl radical (>C=O) and ester linkage

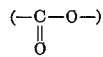

Since the infrared spectrum was completely different from that of polyepichlorohydrin it is clear that the product obtained is a copolymer.

Example 2

1.781 g. of phthalic anhydride and 0.63 ml. of epichlorohydrin (molar ratio of phthalic anhydride:epichlorohydrin=3:2) were used as monomers and the polymerization was carried out at 80° C. for ten days in a similar manner as described in Example 1, using dioxane as the solvent and 0.02 ml. of triethyl aluminum (1 mol percent based on total monomers) as the catalyst. Polymer was obtained in a yield of 81% and the polymer had a reduced viscosity of $\eta_{sp./c.}=0.086$ (in chloroform at 30° C., c.=1 g./dl.) and a melting point of 180°–210° C.

Example 3

0.309 g. of phthalic anhydride and 1.41 ml. of epichlorohydrin (molar ratio of phthalic anhydride:epichlorohydrin=1:9) were used as monomers and the polymerization was carried out at 80° C. for ten days, using dioxane as the solvent and 0.02 ml. of triethyl aluminum (1 mol percent based on total monomers) as the catalyst. Polymer was obtained in a yield of 37.7%. The polymer had a reduced viscosity of $\eta_{sp./c.}=0.16$ (in chloroform at 30° C., c.=1 g./dl.) and a melting point of 80°–110° C.

Example 4

1.185 g. of phthalic anhydride and 2.16 ml. of propylene oxide (molar ratio of phthalic anhydride:propylene oxide=2:8) were used as monomers and the polymerization was carried out at 80° C. for five days, using dioxane as the solvent and 0.04 ml. of diethyl zinc (5 mol percent based on total monomers) as the catalyst. Polymer was obtained in a yield of 25%. The polymer had a reduced viscosity of $\eta_{sp./c.}=0.10$ (in benzene at 30° C., c.=1 g./dl.).

Example 5

4.100 g. of endo-cis-bicyclo (2,2,1)-5-heptene-2,3-dicarboxylic anhydride and 1.7 ml. of propylene oxide (molar ratio of the acid anhydride:propylene oxide=1:1) were used as monomers and the polymerization was carried out at 30° C. for ten days, using tetrahydrofuran as the solvent and diethyl zinc/water mixture (molar ratio 1/1) as the catalyst (1 mole percent based on total monomers). Polymer was obtained in a yield of 58%. The polymer had a reduced viscosity of $\eta_{sp./c.}=0.077$ (in dichloroethane at 30° C., c.=1 g./dl.).

Example 6

4.1 grams of endo-cis-bicyclo (2,2,1)-5-heptene-2,3-dicarboxylic anhydride were placed in a polymerization tube and dissolved by adding about 15 mol. of purified tetrahydrofuran.

1.46 grams of propylene oxide (molar ratio of the acid anhydride:propylene oxide=1:1) were then added to the tube, and after purging the tube with dry nitrogen 0.17 ml. of triethylaluminum (5 mole percent based on total monomers) was added. The tube was then sealed. The tube was placed in a bath maintained at 30° C. and polymerization was conducted for 3 days. At the end of the 3 days the tube was taken out and opened and washed with methanol to take out the polymer formed. Crude polymer thus obtained was repeatedly precipitated from tetrahydrofuran-methanol or benzol-methanol to remove catalyst residue and unreacted monomers. Polymer thus obtained is referred to as polymer (I). Yield of polymer (I) was 27% (based on the total amount of monomers). Reduced viscosity of the polymer (I) was $\eta_{sp./c.}=0.75$ (in dichloroethane at 30° C., c.=1 g./dl.).

In a comparative experiment to see the effects of endo-cis-bicyclo (2,2,1)-5-heptene-2,3-dicarboxylic anhydride propylene oxide alone was polymerized in the same manner. Thus, 1.46 grams of propylene oxide were polymerized without using endo-cis-bicyclo (2,2,1)-5-heptene-2,3-dicarboxylic anhydride at 30° C. for 5 days in the same manner as described above, using 0.17 ml. of triethylaluminum as the catalyst. Polymer obtained in this comparative experiment is referred to as polymer (II). Polymer (II) was obtained in a yield of 40.5% and the reduced viscosity of polymer (II) was $\eta_{sp./c.}=1.17$ (in dichloroethane at 30° C., c.=1 g./dl.).

In another comparative experiment, endo-cis-bicyclo (2,2,1)-5-heptene-2,3-dicarboxylic alone was polymerized using triethylaluminum as the catalyst in the same manner as described above. No polymer was obtained.

Physical properties of polymer (I) and polymer (II) were tested with the following results:

|  | Polymer (I) | Polymer (II) |
|---|---|---|
| Appearance | White solid | White semi-solid. |
| Softening point | 180°–200° C | About 30° C. |
| Solubility— |  |  |
| Methanol: |  |  |
| Room temp | Insoluble | Almost soluble. |
| Hot | do | Soluble. |
| Acetone: |  |  |
| Room temp | do | Almost soluble. |
| Hot | do | Soluble. |
| Hexane: |  |  |
| Room temp | do | Almost soluble. |
| Hot | do | Soluble. |
| Benzol: |  |  |
| Room temp | Soluble | Do. |
| Hot | do | Do. |
| Chloroform: |  |  |
| Room temp | do | Do. |
| Hot | do | Do. |

From above it will be clear that the present invention provides a novel process for the production of propylene oxide polymers which is completely different from hitherto known processes in the polymerization procedure and in the properties of polymers produced.

Infrared spectrum of polymer (I) shows an absorption band due to carbonyl radical. Since endo-cis-bicyclo (2,2,1)-5-heptene-2,3-dicarboxylic anhydride does not polymerize in itself alone as shown in above comparative experiment, it is clear that polymer obtained according to the process of the present invention is a copolymer.

Heretofore, polypropylene oxide has been obtained generally as a mixture of crystalline polypropylene oxide and noncrystalline polypropylene oxide. Noncrystalline polypropylene oxide is liquid to semi-solid at room temperature and soluble in all organic solvents. Water is the only solvent in which noncrystalline polypropylene oxide is insoluble. Crystalline polypropylene oxide is insoluble in cold acetone, cold methanol and cold hexane at temperatures of about $-30°$ C. to $0°$ C., but is soluble in all organic solvents at room temperature and above. Melting point of crystalline polypropylene oxide is low and is within the range of about $60°$ C. to $70°$ C. In contrast to these polypropylene oxide heretofore obtained, propylene oxide endo-cis-bicyclo (2,2,1)-5-heptene-2,3-dicarboxylic anhydride copolymer obtained by the process of the present invention is insoluble in hot methanol, hot acetone and hot hexane and has a very high softening point of about $170°$ C. to $220°$ C. The high insolubility and high softening point of the propylene oxide copolymers of present invention are surprising and would be highly desirable properties in many uses of the products.

Example 7

Following the procedure described in Example 1, 3.28 grams of endo-cis-bicyclo (2,2,1) - 5 - heptene-2,3-dicarboxylic anhydride and 0.292 gram of propylene oxide (molar ratio of the acid anhydride:propylene oxide=4:1) were polymerized at $30°$ C., using 0.17 ml. of triethylaluminum (5 mole percent based on total monomers) as the catalyst. Polymer was obtained in a yield of 29.2%. Reduced viscosity of the polymer was $\eta_{sp./c.}=0.74$ (in dichloroethane at $30°$ C., c.=1 g./dl.). The polymer was insoluble in hot methanol, hot acetone and hot hexane and had a softening point of 175°–195° C.

Example 8

Following exactly the procedure described in above examples, 0.41 gram of endo-cis-bicyclo (2,2,1)-5-heptene-2,3-dicarboxylic anhydride and 1.46 grams of propylene oxide were (molar ratio of the acid anhydride: propylene oxide=1:10) were polymerized at $30°$ C., using 0.17 ml. of triethylaluminum (4.5 mole percent based on total monomers) as the catalyst. Polymer was obtained in a yield of 84.2%. The polymer had a reduced viscosity of $\eta_{sp./c.}=0.64$ (in dichloroethane at $30°$ C., c.=1 g./dl.).

Example 9

Following exactly the procedure described in above examples, 2.05 grams of endo-cis-bicyclo (2,2,1)-5-heptene-2,3-dicarboxylic anhydride and 2.92 grams of propylene oxide (molar ratio of the acid anhydride: propylene oxide=1:4) were polymerized using 0.21 ml. of triethylaluminum (2.5 mole percent based on total monomers) as the catalyst at $30°$ C. for 6 days. Polymer was obtained in a yield of 51.1%. The polymer had a reduced viscosity of $\eta_{sp./c.}=0.18$ (in 1,1,2,2-tetrachloroethane at $30°$ C., c.=0.5 g./dl.).

Example 10

2.05 grams of endo-cis-bicyclo (2,2,1)-5-heptene-2,3-dicarboxylic anhydride were placed in a test tube having an internal capacity of 50 ml. The tube was evacuated and then filled with purified nitrogen. This procedure was repeated three times and then 6 ml. of tetrahydrofuran were added to dissolve the anhydride. 2.92 grams of propylene oxide (molar ratio of the acid anhydride: propylene oxide=1:4) were then added and nitrogen was again passed through the system to remove the trace of oxygen. 0.21 ml. of triethylaluminum (2.5 mole percent based on total monomers) was then added and the test tube was sealed. Polymerization was conducted at $30°$ C. for six days, and the reaction products were treated as described in Example 1. Polymer was obtained in a yield of 35.0%. Reduced viscosity of the polymer was $\eta_{sp./c.}=0.45$ (in 1,1,2,2-tetrachloroethane at $30°$ C., c.=0.5 g./dl.).

Example 11

Following the procedure described in Example 1, 4.10 grams of endo-cis-bicyclo (2,2,1)-5-heptene-2,3-dicarboxylic anhydride and 1.46 grams of propylene oxide (molar ratio of the acid anhydride:propylene oxide=1:1) were polymerized using 0.10 ml. of triethylaluminum (3 mole percent based on total monomers) as the catalyst at $30°$ C. for six days and a polymer was obtained in a yield of 11.5%. Reduced viscosity of the polymer was $\eta_{sp./c.}=0.31$ (in 1,1,2,2-tetrachloroethane at $30°$ C., c.=0.5 g./dl.).

Example 12

In a similar manner as described in above examples, 2.503 grams of succinic anhydride and 1.7 ml. of propylene oxide (molar ratio of succinic anhydride:propylene oxide=1:1) were used as monomers and the polymerization was carried out at $80°$ C., using tetrahydrofuran as the solvent and 0.17 ml. of triethyl aluminum (2.5 mol percent based on total monomers) as the catalyst. Polymer was obtained in a yield of 24.3%. The polymer had a reduced viscosity of $\eta_{sp./c.}=0.11$ (in benzene at $30°$ C., c.=1 g./dl.).

Example 13

In a similar manner as described in above examples, 2.960 grams of phthalic anhydride and 1.56 ml. of epichlorohydrin (molar ratio of phthalic anhydride:epichlorohydrin=1:1) were used as monomers and the polymerization was carried out at $80°$ C. for 7 days using toluene as the solvent and hexane solution of n-butyl lithium (1 mol percent based on total monomers) as the catalyst. A polymer was obtained in a yield of 21.5%. The polymer had a reduced viscosity of $\eta_{sp./c.}=0.83$ (in chloroform at $30°$ C., c.=0.5 g./dl.).

Example 14

In place of epichlorohydrin in the Example 13, 1.35 mol of propylene oxide (molar ratio of phthalic anhydride:propylene oxide=1:1) was used and the polymerization was carried out in the same manner as described in the Example 13. A polymer was obtained in a yield of 15.6%. The polymer had a reduced viscosity of $$\eta_{sp./c.}=0.053$$

(in benzene at $30°$ C., c.=0.5 g./dl.).

Example 15

As a substitute for the hexane solution of n-butyl lithium in the Example 13, dioxane solution of diethyl magnesium (1 mol percent based on total monomers) was used as a catalyst and the polymerization was carried out in the same manner as in Example 13. A polymer was obtained in a yield of 61.7%. The polymer had a reduced viscosity of $\eta_{sp./c.}=0.072$ (in chloroform at $30°$ C., c.=0.5 g./dl.).

Example 16

2.960 grams of phthalic anhydride and 1.35 ml. of propylene oxide (molar ratio of phthalic anhydride:propylene oxide=1:1) were used as monomers and the polymerization was carried out at $80°$ C. for 7 days, using toluene as the solvent and dioxane solution of diethyl magnesium (1 mol percent based on total monomers) as the catalysts. A polymer was obtained in a yield of 43.7%. The polymer had a reduced viscosity of $\eta_{sp./c.}=0.056$ (in benzene at $30°$ C., c.=0.5 g./dl.).

What is claimed is:

1. In the polymerization of an alkylene oxide of the group consisting of compounds of the following general formula:

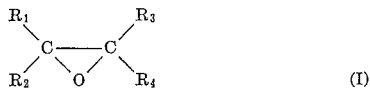

wherein $R_1$, $R_2$, $R_3$ and $R_4$ are radicals selected from the group consisting of hydrogen, alkyl, vinyl, phenyl, chloromethyl, bromomethyl, fluoromethyl, trifluoromethyl, halogen, allyloxymethyl and phenoxymethyl radicals and cyclohexene oxide and derivatives thereof but not all of substituents in the Formula I may be a radical or radicals selected from vinyl and trifluoromethyl, using a catalyst system containing as a component thereof an organometal compound of the formula $R_nM$ wherein M is a metal atom selected from the metals of Groups I-A, II and III-A of the Periodic Table, $n$ is an integer from 1 to 3 inclusive and R is an alkyl radical and wherein some but not all of these radicals may be a radical selected from the group consisting of hydrogen, halogen, hydroxy and alkoxy radicals, the method characterized by that the polymerization of the alkylene oxide is carried out in the presence of a cyclic acid anhydride to produce a copolymer of the alkylene oxide and the cyclic acid anhydride.

2. A process described as in claim 1, wherein the alkylene oxide is a compound selected from the group consisting of ethylene oxide, propylene oxide, and epichlorohydrin.

3. A process described as claim 1, wherein the cyclic acid anhydride is a compound selected from the group consisting of phthalic anhydride, succinic anhydride, and endo-cis-bicyclo (2,2,1)-5-heptene-2,3-dicarboxylic anhydride.

4. In the polymerization of an alkylene oxide of the group consisting of compounds of the following general formula:

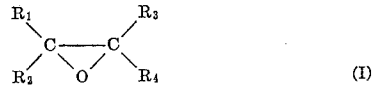

wherein $R_1$, $R_2$, $R_3$ and $R_4$ are radicals selected from the group consisting of hydrogen, alkyl, vinyl, phenyl, chloromethyl, bromomethyl, fluoromethyl, trifluoromethyl, halogen, allyloxymethyl and phenoxymethyl radicals and cyclohexene oxide and derivatives thereof but not all of substituents in the Formula I may be a radical or radicals selected from vinyl and trifluoromethyl, using a catalyst system containing as a component thereof an organometallic compound of the formula $R_nM$ wherein M is a metal atom selected from the metals of Groups I-A, II and III-A of the Periodic Table, $n$ is an integer from 1 to 3 inclusive, and R is an alkyl radical and wherein some but not all of these radicals may be a radical selected from the group consisting of hydrogen, halogen, hydroxy and alkoxy radicals, the method characterized by that the polymerization of the alkylene oxide is carried out in the presence of a cyclic acid anhydride of the following general formulas:

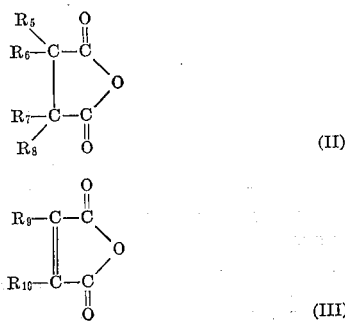

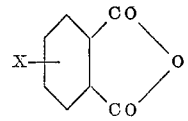

wherein $R_5$, $R_6$, $R_7$, $R_8$, $R_9$ and $R_{10}$ are radicals selected from the group consisting of hydrogen, alkyl and aryl radicals, X is a radical selected from the group consisting of hydrogen, alkyl, aryl, aralkyl, halogen and endomethylene radicals and the six-membered ring of the Formula IV may either be a saturated carbon ring or a carbon ring containing an unsaturated carbon-carbon double bond, to produce a copolymer of the alkylene oxide and the cyclic acid anhydride.

5. A process as described in claim 4, wherein the alkylene oxide is a compound selected from the group consisting of ethylene oxide, propylene oxide, and epichlorohydrin.

6. A process as described in claim 4, wherein the cyclic acid anhydride is a compound selected from the group consisting of phthalic anhydride, succinic anhydride, and endo-cis-bicyclo (2,2,1)-5-heptene-2,3-dicarboxylic anhydride.

7. In the polymerization of an alkylene oxide of the group consisting of compounds of the following general formula:

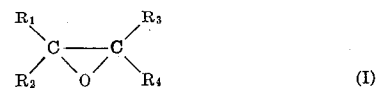

wherein $R_1$, $R_2$, $R_3$ and $R_4$ are radicals selected from the group consisting of hydrogen, alkyl, vinyl, phenyl, chloromethyl, bromomethyl, fluoromethyl, trifluoromethyl, halogen, allyloxymethyl and phenoxymethyl radicals and cyclohexene oxide and derivatives thereof but not all of substituents in the Formula I may be a radical or radicals selected from vinyl and trifluoromethyl, using a catalyst system containing as a component thereof an organometal compound of the formula $R_nM$ wherein M is a metal atom selected from the metals of Groups I-A, II and III-A of the Periodic Table, $n$ is an integer from 1 to 3 inclusive and R is an alkyl radical and wherein some but not all of these radicals may be a radical selected from the group consisting of hydrogen, halogen, hydroxy and alkoxy radicals, the method characterized by that the polymerization of the alkylene oxide is carried out in the presence of a cyclic acid anhydride selected from the group consisting of succinic anhydride, phthalic anhydride, tetrahydrophthalic anhydride, endomethylene-tetrahydrophthalic anhydride and hexahydrophthalic anhydride to produce a copolymer of the alkylene oxide and the cyclic acid anhydride.

8. A process as described in claim 7, wherein the alkylene oxide is a compound selected from the group consisting of ethylene oxide, propylene oxide, and epichlorohydrin.

9. A process as described in claim 7, wherein the cyclic acid anhydride is a compound selected from the group consisting of phthalic anhydride, succinic anhydride, and endo-cis-bicyclo (2,2,1)-5-heptene-2,3-dicarboxylic anhydride.

10. A process as described in claim 1, wherein M is a metal selected from the group consisting of lithium, zinc, magnesium and aluminum.

11. A process as described in claim 7, wherein the catalyst is triethylaluminum.

12. A process as described in claim 7, wherein the catalyst is diethylzinc.

13. A process described in claim 7, wherein the catalyst is n-diethyl-magnesium.

14. A process described in claim 7, wherein the catalyst is n-butyl-lithium.

References Cited

UNITED STATES PATENTS
2,822,350   2/1958   Hayes _____ 260—78.4

FOREIGN PATENTS
500,300   2/1939   Great Britain.
839,773   6/1960   Great Britain.

OTHER REFERENCES
Tsurata et al.: Die Makromolekulare Chemie, Band 75, p. 211 to 214.

E. Schwerk et al.: Die Makromolekulare Chemie, 51 (1962), page 53.

JOSEPH L. SCHOFER, *Primary Examiner.*

L. WOLF, L. G. CHILDERS, J. KIGHT III,
                    *Assistant Examiners.*